(12) United States Patent
Rahn et al.

(10) Patent No.: US 7,889,227 B2
(45) Date of Patent: Feb. 15, 2011

(54) INTUITIVE USER INTERFACE FOR ENDOSCOPIC VIEW VISUALIZATION

(75) Inventors: Norbert Rahn, Forchheim (DE);
Chenyang Xu, Allentown, NJ (US);
Yiyong Sun, Lawrenceville, NJ (US);
Scott Baker, Edwardsburg, MI (US);
Matthias John, Nürnberg (DE); Herve Lombaert, Montreal (CA)

(73) Assignee: Siemens Aktiengesellschaft (DE)

( * ) Notice: Subject to any disclaimer, the term of this patent is extended or adjusted under 35 U.S.C. 154(b) by 1491 days.

(21) Appl. No.: 11/227,807

(22) Filed: Sep. 15, 2005

(65) Prior Publication Data
US 2007/0061726 A1    Mar. 15, 2007

(51) Int. Cl.
H04N 9/47      (2006.01)
H04N 15/00    (2006.01)
A61B 1/06      (2006.01)
A61B 1/00      (2006.01)

(52) U.S. Cl. .......................... 348/65; 348/45; 348/77; 348/78; 600/101; 600/103

(58) Field of Classification Search ............... 348/24, 348/37, 42, 45, 46, 53, 61, 65, 77, 78, 180, 348/207.99; 382/128, 131, 132, 133, 134, 382/312, 313, 314, 315, 316, 317; 358/452, 358/453, 482, 483, 484; 600/301, 300, 425, 600/101, 103

See application file for complete search history.

(56) References Cited

U.S. PATENT DOCUMENTS

| | | | |
|---|---|---|---|
| 7,594,188 B2* | 9/2009 | Rudolph et al. | 715/810 |
| 7,648,461 B2* | 1/2010 | Thiele | 600/453 |
| 2002/0119432 A1* | 8/2002 | Ranta et al. | 434/263 |
| 2005/0041282 A1* | 2/2005 | Rudolph et al. | 359/368 |
| 2005/0078790 A1* | 4/2005 | Kikuchi et al. | 378/73 |
| 2006/0052689 A1* | 3/2006 | Scouten et al. | 600/417 |
| 2007/0032720 A1* | 2/2007 | Koivukangas et al. | 600/407 |
| 2008/0269606 A1* | 10/2008 | Matsumura | 600/438 |

OTHER PUBLICATIONS

U.S. Appl. No. 11/217,211, filed Aug. 31, 2005, Qinglin Ma, Gianluca Paladini, Carol M. Lowery, Christopher S. Chapman.

* cited by examiner

Primary Examiner—Jerome Grant, II
(74) Attorney, Agent, or Firm—Brinks Hofer Gilson & Lione

(57) ABSTRACT

An intuitive user interface is provided for endoscopic view visualization. The user interface may permit individual or simultaneous navigation through images displayed in an endoscopic view window, a three dimensional overview window, and a multi-planar reformatted window. An operation performed directly on one of the windows may commence the navigation. The endoscopic view window may be divided into a plurality of sub-regions, each sub-region having a corresponding navigation function. The endoscopic view window and the three dimensional overview window may have corresponding icons related to a single location in corresponding images being displayed. The corresponding icons may be color coded to facilitate intuitive alignment of the corresponding images displayed in the different windows. The three dimensional overview window may have a geometric icon to facilitate intuitive alignment of the corresponding images. The multi-planar reformatted window may permit spherical navigation through the images displayed.

25 Claims, 8 Drawing Sheets

INTUITIVE USER INTERFACE FOR ENDOSCOPIC VIEW VISUALIZATION

BACKGROUND

The present embodiments relate generally to the display of images on a display screen. In particular, the present embodiments relate to three dimensional visualizations of three dimensional data, such as computed tomography, magnetic resonance, x-ray rotation angiography, three dimensional ultrasound, and/or other medical data.

Endoscopic view visualizations may provide three dimensional visualizations from the inside of vessels and/or tube-like or hollow organs. The viewing point may be located within the three dimensional anatomical structure. To achieve an endoscopic view visualization, many visualization parameters may be modified, including viewing point (x, y, z), viewing direction (yaw, pitch, roll), viewing angle, threshold for extraction of the inner surface of the hollow organ, and smoothness of the inner surface of the hollow organ. Conventional user interfaces for endoscopic view visualization may employ complex user operations, especially when moving within relatively large hollow organs (e.g., heart chambers) where the degrees of freedom regarding the movement are less limited than other structures, such as within thin vessel structures.

For instance, a number of implementations of user interfaces exist on different workstations produced by various manufacturers. The Med-Leonardo workstation manufactured by Siemens Medical Solutions (located in Erlangen, Germany) provides a solution with four windows. One segment contains the endoscopic view visualization, the remaining three segments contain two dimensional windows (referred to as MPRs (multi-planar reformatting) of the three dimensional anatomy. The modification of the endoscopic view parameters, viewing point, and the viewing orientation may be changed by right clicking on the endoscopic view window and by selecting a modification parameter from a menu. However, this user interface is cumbersome to use due to the complexity of the application, especially when navigating within large hollow organs.

BRIEF SUMMARY

By way of introduction, the embodiments described below include methods, processes, apparatuses, instructions, or systems for providing an intuitive user interface for endoscopic view visualization. The user interface may display images in an endoscopic view window, a three dimensional overview window, and/or a multi-planar reformatted window. An operation performed directly on a window may commence navigation through the images. A window may be divided into a plurality of sub-regions, each sub-region having a corresponding navigation function. Alternatively, a window may permit "spherical navigation" through the images. Two or more of the windows may have corresponding icons related to a single location in corresponding images being displayed. The corresponding icons may be color coded to facilitate intuitive alignment of the corresponding images by a user.

In a first aspect, a data processing system enhances endoscopic view visualization. The system includes a display screen operable to display endoscopy related images in a window, the window presenting an endoscopic view visualization. The system also includes a user interface operable to provide navigation through the endoscopy related images via an operation performed directly upon the window.

In a second aspect, a data processing system includes a display screen operable to display images related to endoscopy in an endoscopic view window and a multi-planar reformatted window. The system also includes a user interface operable to provide navigation through the images in the endoscopic view window via an operation performed directly upon the multi-planar reformatted window.

In a third aspect, a data processing system includes a display screen operable to display images related to endoscopy in an endoscopic view window and a three dimensional overview window. The system also includes a user interface operable to provide navigation through the images, wherein the endoscopic view window and the three dimension overview window each have one or more corresponding icons associated with the same location in corresponding images, the corresponding icons facilitate intuitive alignment of the corresponding images.

In a fourth aspect, a method includes displaying endoscopy related images in an endoscopic view window, a three dimensional overview window, and a multi-planar reformatted window. The method also includes navigating through the endoscopy related images via an operation performed directly upon either the endoscopic view window, the three dimensional overview window, or the multi-planar reformatted window.

In a fifth aspect, a computer-readable medium having instructions executable on a computer and stored thereon is described. The instructions include displaying endoscopy related images in a window, and navigating through the endoscopy related images via an operation performed directly upon the window.

The present invention is defined by the following claims. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The present embodiments will become more fully understood from the detailed description given herein below and the accompanying drawings which are given by way of illustration only, and are not limitative of the present invention, and wherein.

DETAILED DESCRIPTION OF THE DRAWINGS AND PRESENTLY PREFERRED EMBODIMENTS

A system and method provide an intuitive user interface for endoscopic view visualization. The user interface may present images in an endoscopic view window, a three dimensional overview (3DO) window, and one or more multi-planar reformatted (MPR) windows. An operation performed directly on one of the windows may commence the navigation. The endoscopic view window may be divided into a plurality of sub-regions, each sub-region having a corresponding navigation function. A MPR window may permit "spherical navigation" through the images displayed. The images may include computed tomography, magnetic resonance, x-ray, ultrasound, PET, and/or other images.

The user interface may facilitate the intuitive alignment of corresponding images displayed within one or more different windows. For instance, the 3DO window may have a geometric icon to facilitate intuitive alignment of the images. The endoscopic view window and the 3DO window may have corresponding icons related to a single location in corresponding images being displayed. The corresponding icons may be color coded and/or similarly shaped to facilitate intuitive alignment of the corresponding images in the different windows.

Figure 1:
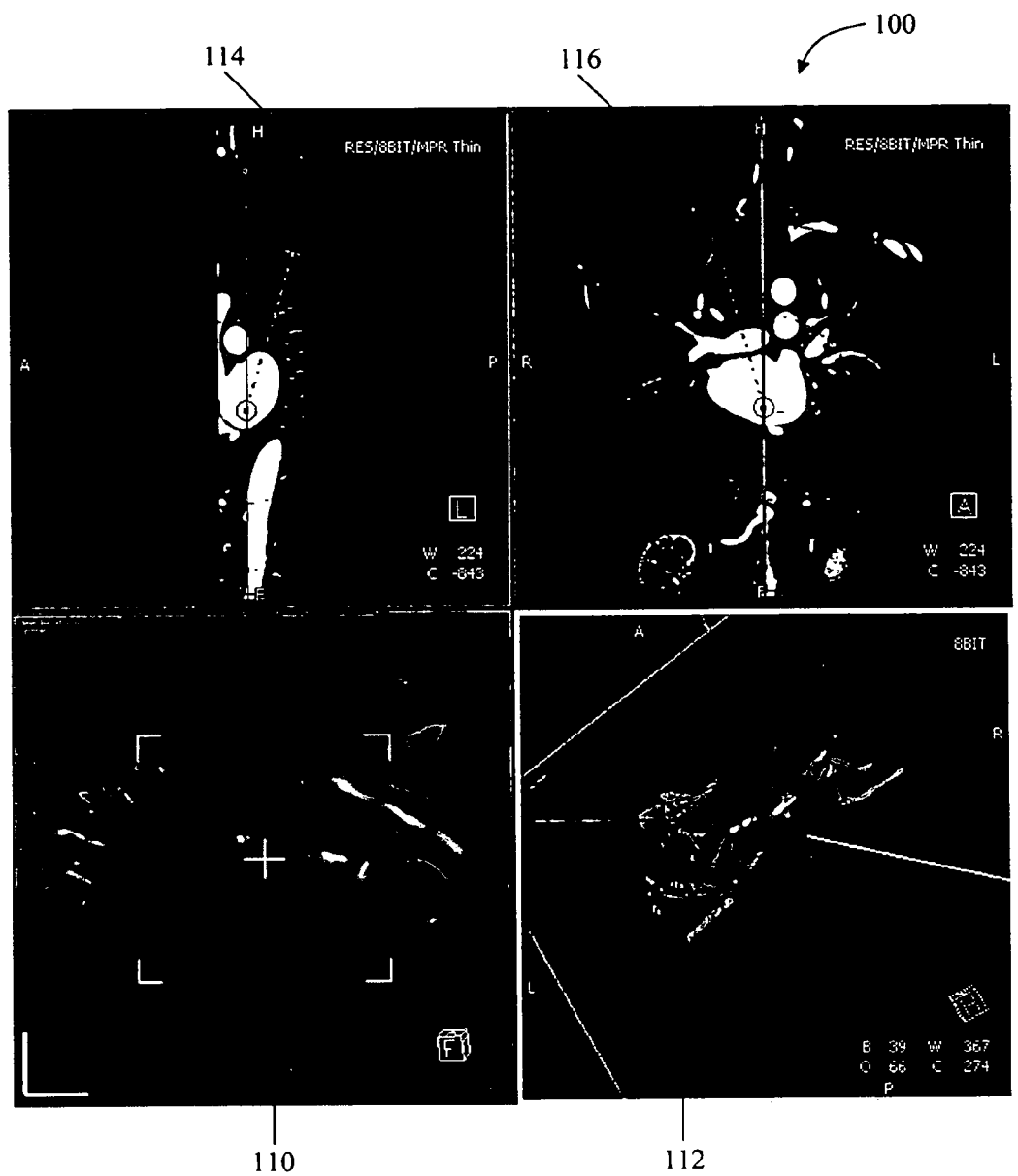
FIG. 1 is an exemplary user interface for endoscopic view visualization.

FIG. 1 illustrates an exemplary user interface 100 for endoscopic view visualization. The user interface 100 may initially display one or more endoscopy related three dimensional images after the images are retrieved from memory or a storage unit. The viewing point of the images displayed may be the center of or within a hollow organ, chamber, or vessel to be visualized. The user interface 100 may present an endoscopic view window 110, a three dimensional endoscopic overview (3DO) window 112, and one or more multi-planar reformatted (MPR) windows 114, 116. The user interface may include additional, fewer, or alternative windows.

Figure 2:
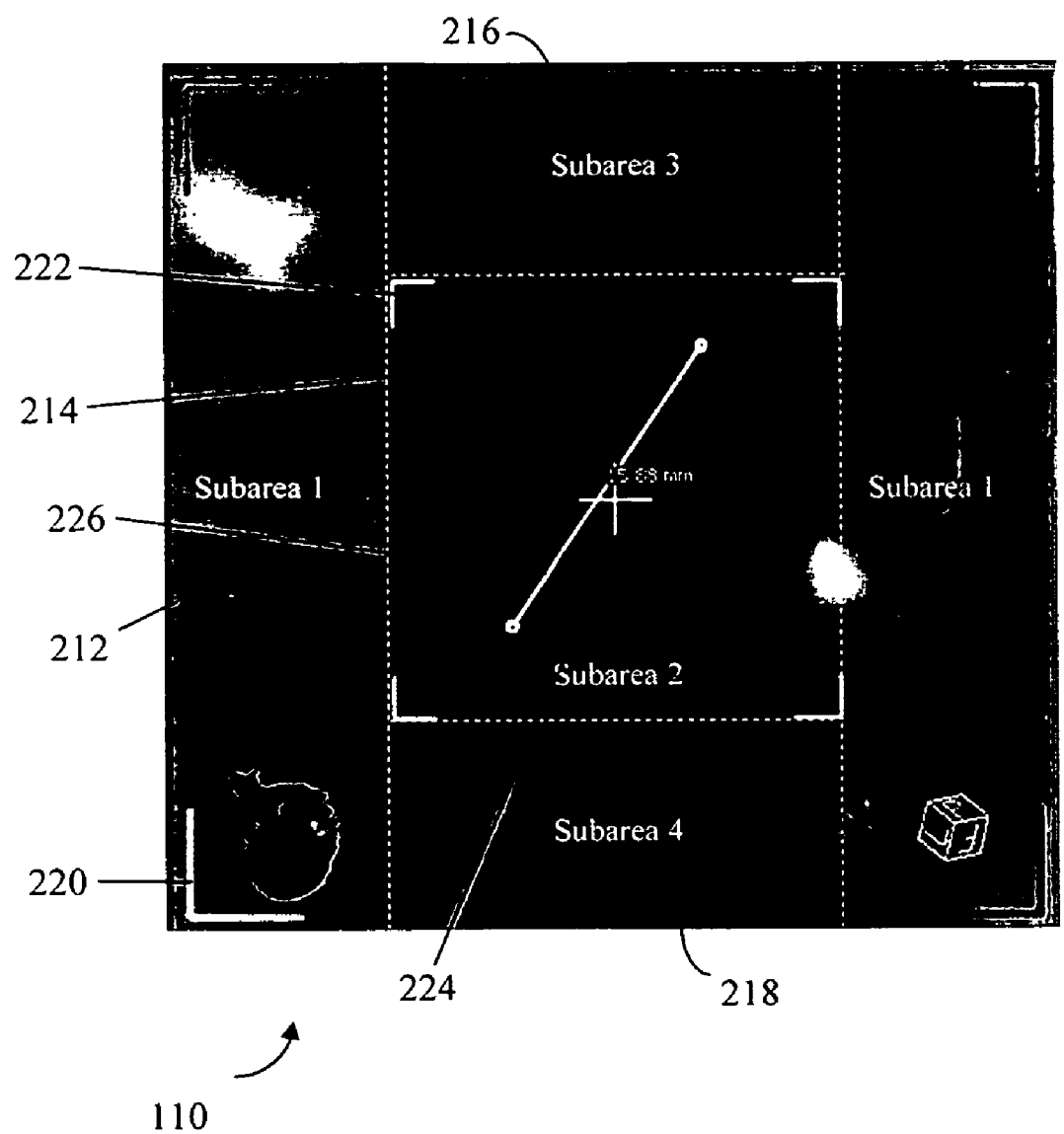
FIG. 2 is an exemplary endoscopic view window.

FIG. 2 illustrates an exemplary endoscopic view window 110. The endoscopic view window 110 may display an endoscopic view visualization comprising endoscopy related images of internal bodily images. As shown in the example of FIG. 2, the endoscopic view window 110 may be divided into sub-regions. The endoscopic view window 110 may be divided into sub-area 1 212, sub-area 2 214, sub-area 3 216, and sub-area 4 218. The endoscopic view window 110 may be divided into additional, fewer, or alternate sub-regions. Alternatively, the 3DO window 112, one or more MPR windows 114, 116, or other windows may be divided into sub-regions.

Each sub-region may correspond to different navigation functionality provided for by the user interface. The navigation function associated with a sub-region may be initiated by performing an operation directly on the sub-region.

For example, a user may move a cursor into a new sub-region via a mouse, keyboard, touch pad, touch screen, or other input device. The location of the cursor may determine which navigation function the user interface performs. The navigation function may be initiated by performing an operation on the cursor, such as right or left clicking a mouse, or by the movement of the cursor into or within a new sub-region. Alternatively, the user may touch the sub-region displayed on a touch screen or via a touch pad. The user interface may provide haptic feedback to the user. Other operations performed directly on the window may initiate navigation functionality. Accordingly, the need to provide one or more menus and/or sub-menus that permit access to the navigation functionality of the user interface may be alleviated. The menus and sub-menus may require multiple time consuming and inconvenient user operations to access navigation functionality.

The navigation functionality associated with a sub-region of a window may include moving the current viewing point forward or backward, rotating the images displayed in a window about the current viewing point, adjusting the roll angle of the endoscopic view visualization, and/or translating the current viewing point in a two-dimensional plane, such as the x-y plane. The navigation functionality may include panning and/or zooming images. Additional, fewer, or alternative navigation functions may be associated with a sub-region of a window. Assigning functions to different buttons, knobs, or sliders may be avoided.

In one embodiment, moving or dragging the cursor up and down within sub-area 1 212 may move the current viewing point forward and backward, respectively, and provide translation along the z-axis. Moving the cursor within sub-area 2 214 may rotate the endoscopic view visualization shown in FIG. 2 around the current viewing point. Sub-area 2 214 may provide functionality that adjusts two angles in accordance with horizontal and vertical cursor or input device movement. Moving the cursor horizontally within sub-area 3 may alter the roll angle of the endoscopic view visualization. Moving the cursor horizontally and/or vertically within sub-area 4 may alter the x-axis and/or y-axis translation of the current viewing point. Other input function to sub-area associations may be used.

Performing an operation anywhere within the endoscopic view window 110 may result in maximizing the endoscopic view for the convenience of a user. For example, a user may double-click on a mouse or use another input device to enlarge the endoscopic view window 110 such that the endoscopic view window 110 subsequently substantially occupies the entire display screen.

The endoscopic view window 110 may have one or more alignment icons 220, one or more boundary icons 222, a crosshair alignment icon 224, and a distance measurement icon 226. The endoscopic view window 110 may have additional, fewer, or alternative alignment icons.

The alignment icons 220 and the boundary icons 222 may each be shaped as a corner piece or a partial picture frame. Each of the alignment and boundary icons 220, 222 may have a different color, such as red, blue, green, yellow, or other color. Each color may be associated with a sub-region or corner of the display screen or other location, such as a location within an image displayed. Alternate shapes and colors may be used.

Each boundary icon 222 may identify the boundary of a sub-region. Each of the alignment icons 220 and 224 may facilitate the visual alignment of the images displayed in the endoscopic view window 110 with corresponding images displayed in one or more other windows. For instance, each of the alignment icons 220 and 224 may have a corresponding icon in one or more other windows. The corresponding icons may be color coded and/or similarly shaped to facilitate intuitive alignment and orientation of the corresponding images displayed in different windows.

For instance, each of the different colors may correspond to the colored lines/corners associated with the symbolic viewing geometry of the 3DO window 112, as discussed below. The crosshairs alignment icon 224 located in the center of the endoscopic view window 110 may correspond to a line of sight icon within the 3DO window 112.

In one embodiment, distance measurement within the endoscopic view window 110 may be performed by distance measurement functionality provided for by the user interface. The user interface may employ a distance measurement icon 226 to visually represent the distance measured. The user interface also may indicate the value of the distance measured.

A distance measurement mode may be entered to that provides distance measurement functionality by performing an operation on a button or icon. After which, an operation may be performed directly on the distance measurement icon 226 without navigating through the images. Such an operation may permit the distance measurement icon 226 to be resized to the distance desired to be measured.

Additionally, the initial upper and lower thresholds used to extract and visualize the inner object surface may be calculated in an automatic manner. The viewing angle may be initially set to a default value. The viewing orientation may be set to an application specific default, such as an angle associated with the Digital Imaging and Communications in Medicine (DICOM) coordinate system.

In addition to the endoscopic view visualization provided for by the endoscopic view window 110, it may be beneficial to have at least one three dimensional overview image and one or more two dimensional images which show the anatomy and the viewing geometry of the endoscopic view visualization. The combination of the endoscopic view visualization with the two and three dimensional images may facilitate the mental alignment of the endoscopic view image(s) with the actual two and/or three dimensional anatomy in the mind of a user.

Figure 3:
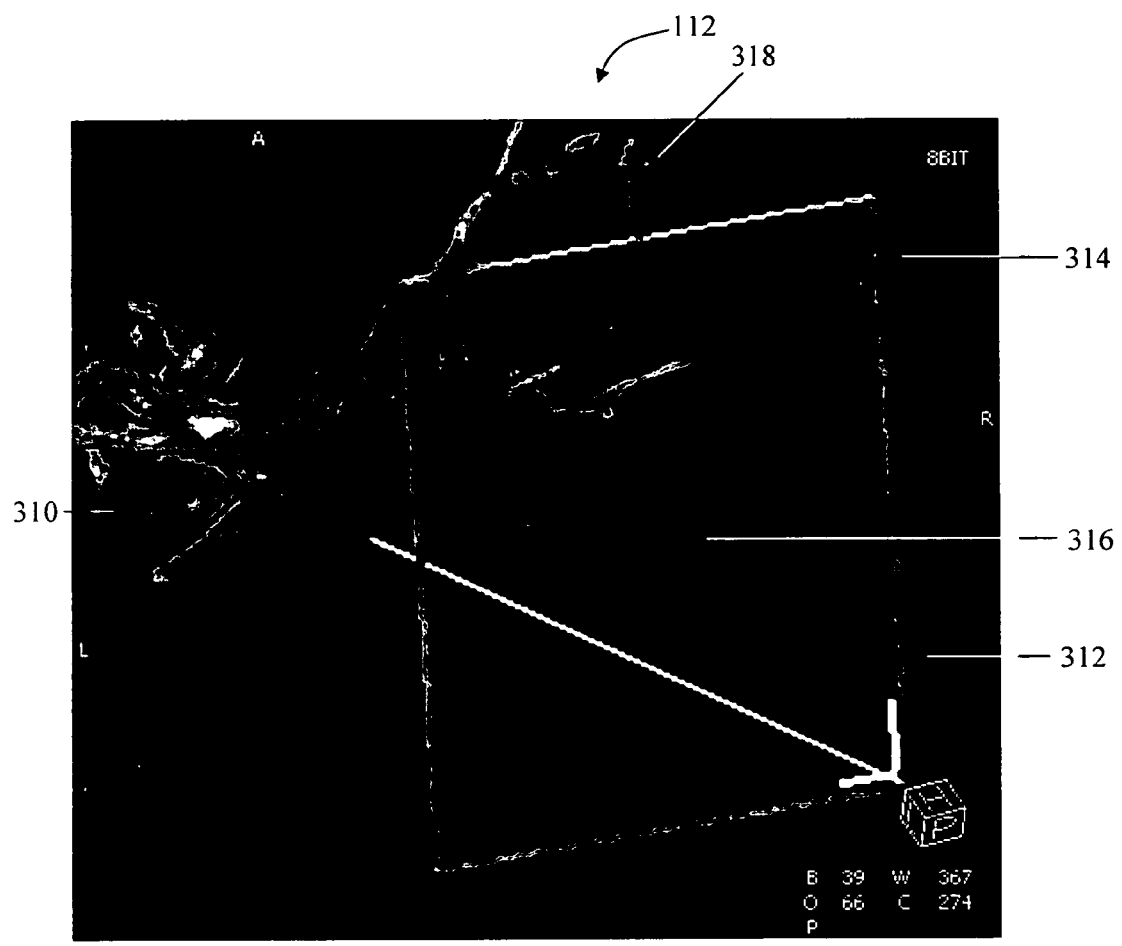
FIG. 3 is an exemplary three dimensional endoscopic overview window.

FIG. 3 illustrates an exemplary three dimensional overview (3DO) window 112. The 3DO window 112 may include a three dimensional overview image 310 and symbolic viewing geometry. The symbolic viewing geometry may include a geometric alignment icon 312, one or more positional alignment icons 314, a line of sight alignment icon 316, and a directional icon 318. The 3DO window 112 may include additional, fewer, or alternate images and icons.

The three dimensional overview (3DO) image 310 may be an image of an internal organ or other object 310. The 3DO image 310 may be an original image or generated from data associated with a previously performed procedure, such as a segmentation procedure. The 3DO image 310 may be rotated, zoomed, and/or panned via operations performed using the user interface, such as by dragging a cursor along the display screen with a mouse or other input device. Other manipulations of the 3DO image may be performed.

The geometric alignment icon 312, the positional alignment icon 314, and the line of sight alignment icon 316 may each have a corresponding icon located in one or more other windows to facilitate the intuitive alignment of corresponding images displayed. As shown in the example of FIG. 3, the geometric alignment icon 312 may have a frame that is substantially rectangular in shape. Alternate geometric shapes may be used. The geometric alignment icon 312 may have a number of legs extending into the 3DO image 310, such as from the corners of the geometric alignment icon 312. The geometric alignment icon 312 may be color coded to facilitate alignment of the corresponding images displayed. For example, the sides of the rectangular frame or the individual legs may each have a different color. Different alignment tools may be used.

The positional alignment icons 314 also may be color coded to coincide with locations within the 3DO image 310 or to correspond with portions of the geometric icon 312, such as the legs. Either a positional alignment icon 314 and a leg of the geometric icon 312, or both, may be color coded to correspond to icons in another window. In one embodiment, one or more positional alignment icons 314 and the legs of the geometric icon 312 correspond to the alignment icons shown in FIG. 2. Each of the legs of the geometric icon 312 may be envisioned as extending from a corresponding alignment icon to an associated boundary icon shown in FIG. 2.

The line of sight alignment icon 316 may correspond to the crosshairs alignment icon of FIG. 2. The line of sight alignment icon 316 may be shaped or colored similarly to the crosshairs alignment icon. Other corresponding sets of icons between the endoscopic view window 110 and the 3DO window 112 may facilitate intuitive alignment between corresponding images being displayed in the different windows 110, 112.

An operation performed upon the line of sight icon 316 in the 3DO window 112, may result in the immediate alteration in the orientation of the corresponding images in the endoscopic view window 110. For example, dragging or moving the tip of the line of sight icon 316, such as via a mouse or other input device, may change the orientation of the images displayed in the endoscopic view window 110. The current viewing point, associated with the crosshairs icon in FIG. 2, may be moved left, right, up, or down in FIG. 3. As shown in FIG. 3, the current viewing point may be illustrated as being within the 3DO image 310. Alternative navigation functions may be provided by the line of sight icon 316, such as rotating and translating the images. Similarly, an operation performed on the geometric icon 312 or the positional alignment icons 314 may result in the movement, rotation, or translation of the images displayed in one or more windows.

The directional icon 318 may be color coded or shaped to correspond to an icon located in another window. The directional icon 318 may provide navigation functionality, including the functionality discussed above with respect to the line of sight icon 316.

Figure 4:
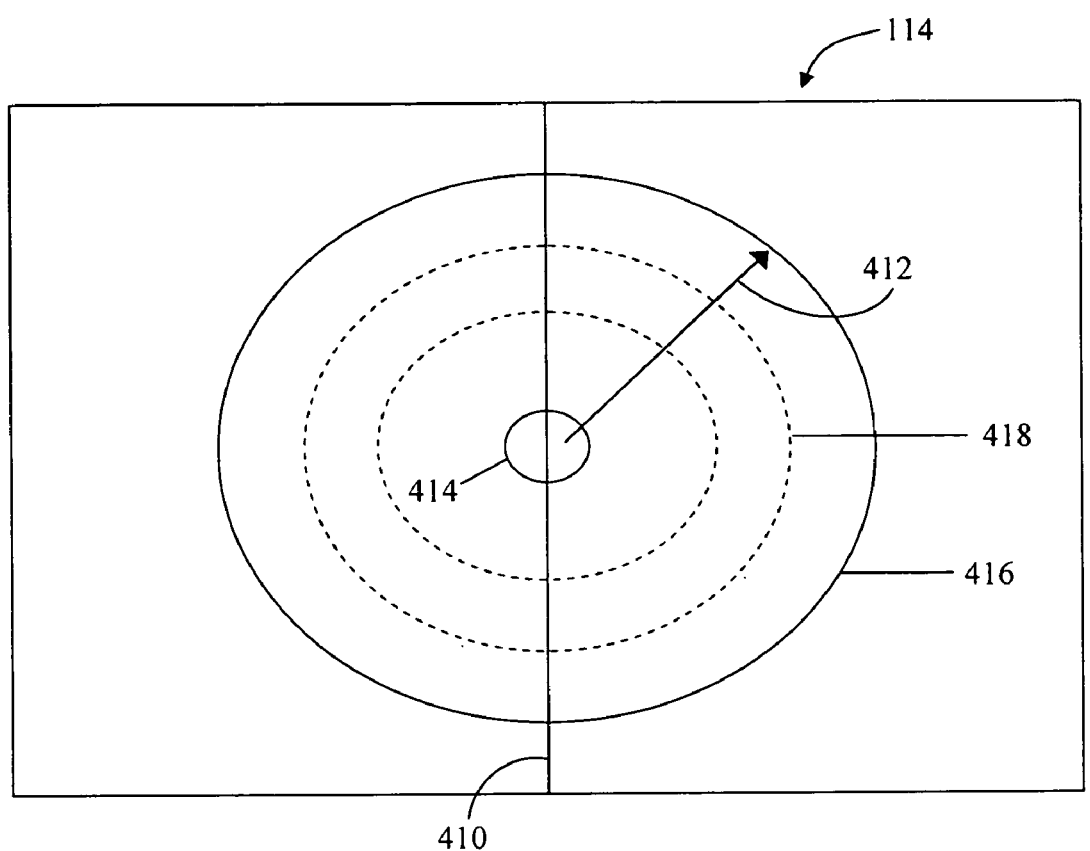
FIGS. 4 and 5 are exemplary multi-planar reformatted windows.
Figure 5:
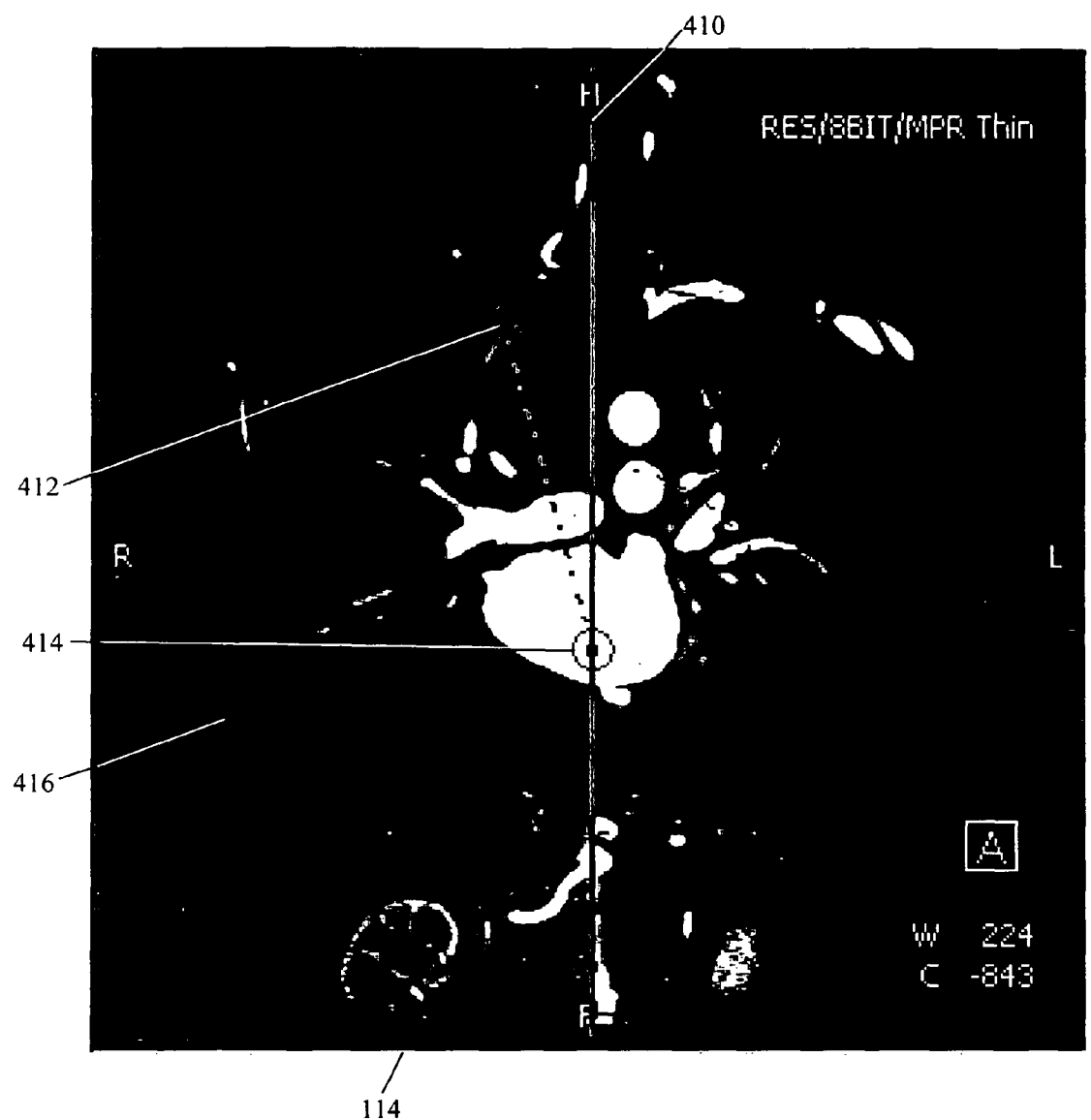

FIGS. 4 and 5 illustrate exemplary multi-planar reformatted (MPR) windows 114, 116. The multi-planar reformatted windows 114, 116 may display multi-planar reformatted two and/or three dimensional images. Each multi-planar reformatted window 114, 116 may have a solid line icon 410, a directional icon 412, a center icon 414, and one or more regional icons 416, 418. Each multi-planar reformatted window 114, 116 may have additional, fewer, or alternate icons and components.

The user interface may permit a user to move the solid line icon 410 of one MPR window 114, 116 across the display screen to scroll through corresponding images displayed in the other MPR window, the endoscopic view window, the 3DO window, or other windows. Alternatively, the images displayed in the MPR windows 114, 116 may be scrolled by moving the cursor up and down within the window with a mouse or other input device. The solid line icons 410 may be rotated to create an oblique multi-planar reformatted image. Other navigation functionality may be provided for by the solid line icon.

The MPR windows 114, 116 may provide for "spherical navigation" through the images. Spherical navigation may permit two dimensional images displayed in the MPR windows 114, 116 to be used to navigate through the two and/or three dimensional corresponding images displayed in the endoscopic view window 110, the 3DO window 112, and/or the MPR windows 114, 116.

Spherical navigation may be accomplished by modifying the directional icon 412 in one of the MPR windows 114, 116. The position and orientation of the directional icon 412 in the other MPR window 114, 116 may be automatically updated when the directional icon 412 is altered. The directional icon 412 may represent the viewing point and viewing orientation of the endoscopic view window. For instance, the base of the directional icon 412 may represent or coincide with the current viewing position. The orientation of the directional icon 412 may correspond to the line of sight of the endoscopy view window, as well as the line of sight icon associated with the 3DO window.

The tip of the directional icon 412, i.e., the arrow in the example shown, and/or the base of the directional icon 412 may be moved by clicking on the directional icon 412 and dragging it across the display screen via a mouse or other input device. Moving either the tip or the base, or both, may result in corresponding images in one or more of the other windows automatically being updated. For example, by moving the directional icon 412 in one of the MPR windows 114, 116, the crosshair icon of the endoscopy view window 110 and/or the geometric icon and the line of sight icon of the 3DO window 112 may be automatically updated. The corresponding images displayed in the endoscopic view window and/or the 3DO window also may be automatically updated and/or re-centered.

As shown in the example of FIG. 4, the larger regional icon 416 may be solid and circular in shape. Other shapes may be used. The larger regional icon 416 may represent the maximum length that the directional icon 412 may be adjusted to. When the directional icon 412 is modified to reach the regional icon 416, the camera angle may be parallel to the displayed MPR plane. In this situation, the camera may be envisioned as being positioned at approximately zero degrees.

The smaller regional icons 418 may be dashed and circular in shape. Other shapes may be used. The smaller regional icons 418 may represent projections of approximately 30 and 60 degrees latitude. Modifying the directional icon 412 such that the tip touches the smaller regional icon 418 may indicate that the camera is at an angle of either approximately 30 or approximately 60 degrees with respect to the MPR plane.

The displayed directional icon 412 may be altered in color or shape to provide information to a user. A dashed directional icon 412 may indicate that the camera is pointing into the image displayed on the display screen. A solid directional icon 412 may indicate that the camera is pointing out of the image displayed on the display screen. In one embodiment, as the MPR slice is altered, a change in the color of the directional icon 412 and/or the disappearance of the regional icon(s) 418 from the display screen indicates that the current MPR display is currently not coinciding with the endoscopic view window. In other words, the directional icon 412 is no longer on the current MPR plane.

The user interface may provide spherical navigation functionality, i.e., navigation through the images using the directional icon 412, one or more regional icons 416, 418, or a combination of icons, in a number of manners. For example, performing an operation upon the tip of the directional icon 412 may alter the orientation of the camera. A user may click upon or drag the tip of the directional icon 412 with a mouse or other input device. Moving the cursor inside the larger regional icon 416 may keep the camera directed at a position within the region encompassed.

Moving the base of the directional icon 412 may translate the camera within the region encompassed by the MPR window 114. The user may click on and/or drag the cursor with an input device. Moving the tip of the directional icon 412 beyond the larger regional icon 416 may move the camera into the opposite hemisphere. For example, if the camera were pointing out of the image displayed, dragging the tip of the directional icon 412 beyond the larger regional icon 416 may alter the direction of the camera such that the camera points into the image displayed.

The user interface may provide endoscopic view visualization with collision detection. Tactile, acoustic, optic, or other feedback may be delivered to the user to indicate a collision. If the endoscopic view visualization is done after a previously performed segmentation of the object of the interest, such as a heart chamber, the wall of the object of interest may be determined. As a result, a "collision detection mode" may be enabled.

In collision detection mode, any modification of the endoscopic view visualization that would result in a viewing point location being located outside of the object is not allowed and will not be performed. The modifications may include interactions on the endoscopic view window, the 3DO window, and/or one or more MPR windows. As a result of the automatic collision detection, the viewing point may always remain within the object of interest and may produce valid endoscopic view visualizations from the inside of the object of interest. Hence, collision detection may prevent inadvertent erroneous operation of the user interface. Alternatively, navigation outside the object is allowed.

Figure 6:
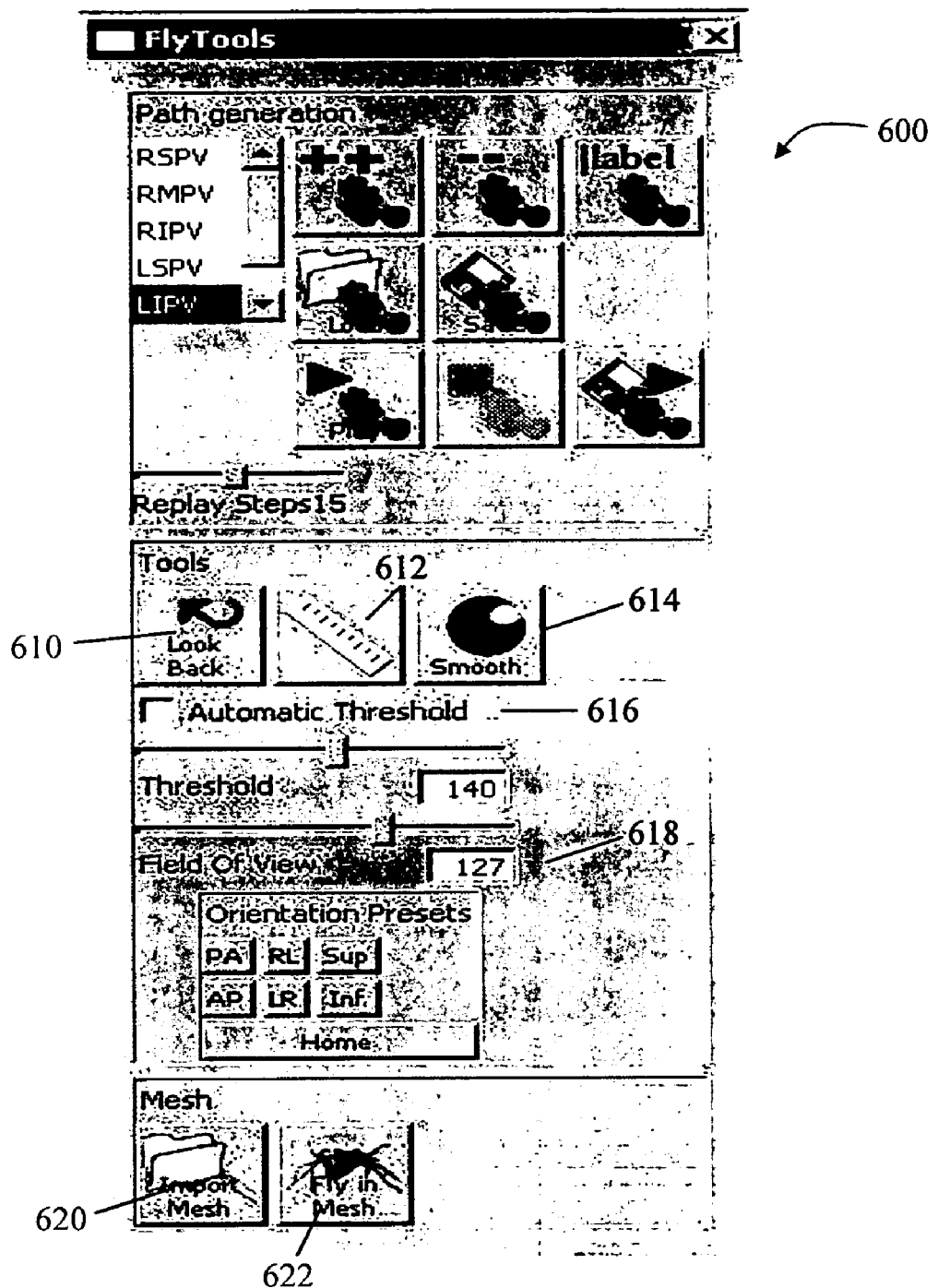
FIG. 6 is an exemplary user interface control panel.

FIG. 6 illustrates an exemplary user interface control panel 600. The control panel 600 may provide functionality that permits image path generation such as loading, saving, playing, adding, subtracting, and labeling images. The control panel 600 may include a look back icon 610, a distance icon 612, a smooth icon 614, threshold functionality 616, field of view functionality 618, an import icon 620, and a mesh icon 622. The control panel 600 may include additional, fewer, or alternative icons and functionality.

The look back icon 610 may control the viewing angle of the endoscopic view visualization. For example, the look back icon 610 may provide functionality that adjusts the camera angle by approximately 180 degrees or more, i.e., "look back" functionality.

The distance icon 612 may enable distance measurement mode. In distance measurement mode, an operation performed on the endoscopic view window, such as dragging the cursor via a mouse or other input device, may result in an actual distance within the image displayed in the endoscopic view window being measured, including the depth dimension.

The smooth icon 614 may perform filtering and noise removal. An operation performed on the smooth icon 614 may smooth the inner surface of the object to be visualized by the endoscopic view window. Several subsequent smooth operations may be performed. The smooth operations may be undone by nested "undo" functionality.

Threshold functionality 616 related to the boundary of an image or chamber may be provided. The threshold functionality 616 may adjust an upper and lower threshold for the inner surface to be visualized in the endoscopic view window or other window.

Field of view functionality 618 may change the angle of the camera. The field of view functionality 618 may present one or more buttons associated with preset camera angles. If a user gets disorientated by rotating or manipulating the images, the user may be provided with the option of returning to a preset camera angle. The preset angles may include posterior anterior (PA), anterior posterior (AP), right to left (RL), left to right (LR), superior (SUP), and inferior (INF) preset orientations. Other preset orientations may be used.

The import icon 620 may permit importing and saving image data. The mesh icon 622 may permit replaying the image data. The image data may be generated by the interpolation or integration of different endoscopic view visualizations. All of the parameters of an endoscopic view visualization in a path list may be stored via the import icon 620, mesh icon 622, or another icon. The path list may be subsequently used to select one path list entry and to reproduce a previously stored endoscopic view visualization, including all of its distinct parameters.

EXEMPLARY EMBODIMENTS

Figure 7:
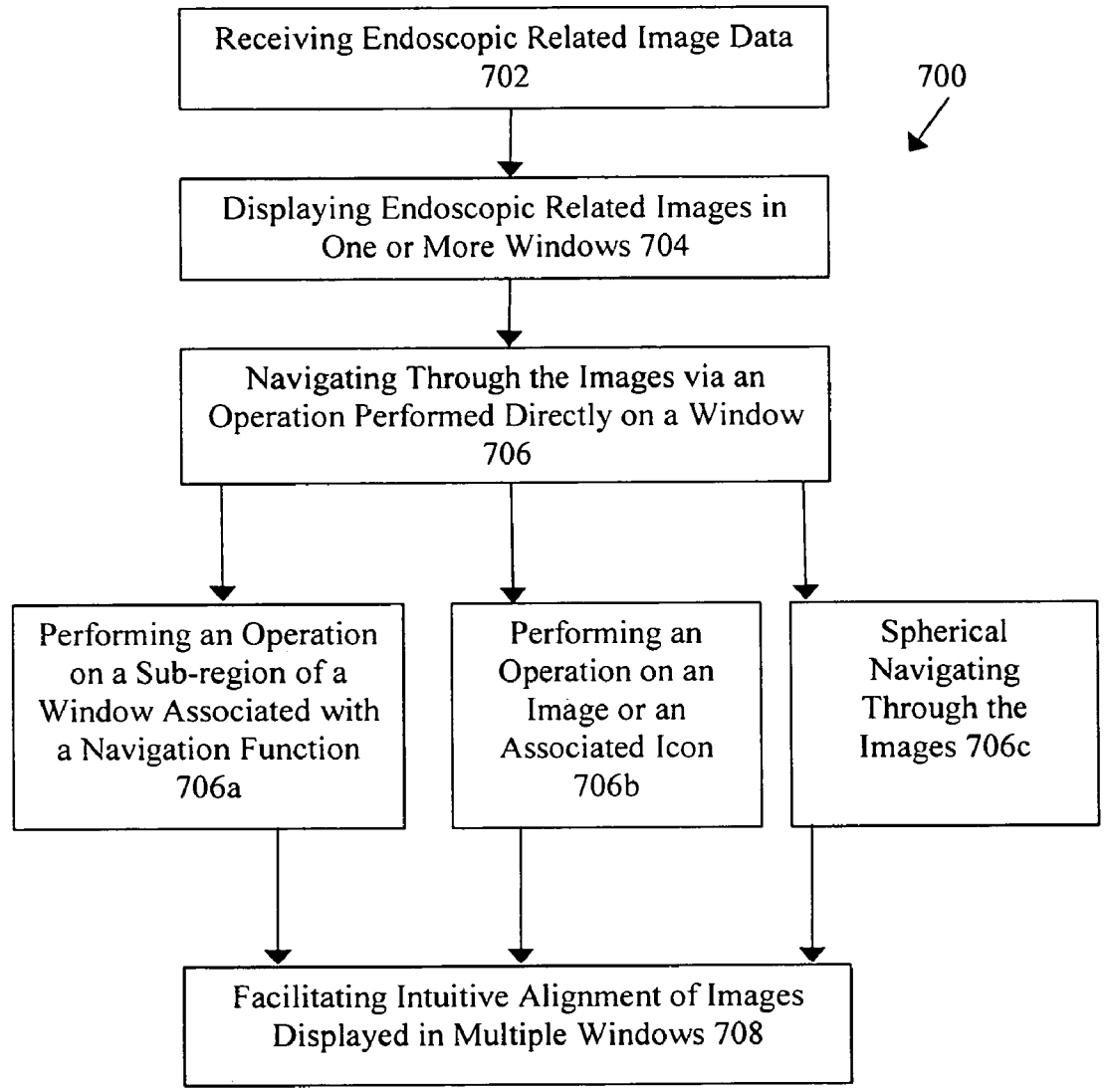
FIG. 7 is an exemplary method.

FIG. 7 is an exemplary method for endoscopic view visualization 700. The method 700 may include receiving endoscopic related image data 702, displaying endoscopic related images in one or more windows 704, navigating through the images via an operation performed directly on the window 706, and facilitating intuitive alignment of images displayed in multiple windows 708. The method may include additional, fewer, or alternate actions.

Figure 8:
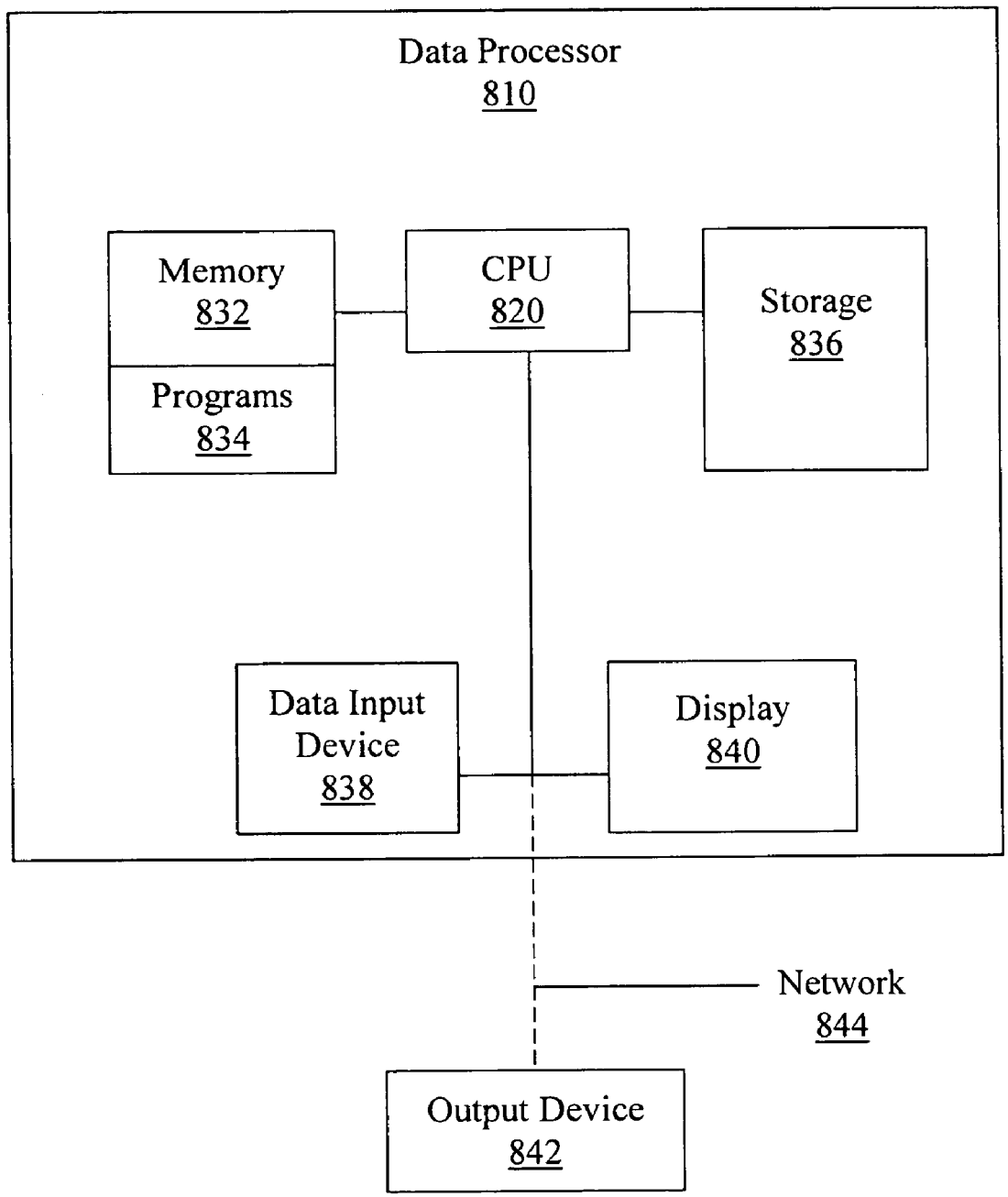
FIG. 8 is an exemplary data processing system.

The method for endoscopic view visualization 700 may be facilitated by a data processing system. FIG. 8 is a block diagram of an exemplary data processor 810 configured or adapted to provide functionality for endoscopic view visualization. The data processor 810 may include a central processing unit (CPU) 820, a memory 832, a storage device 836, a data input device 838, and a display 840. The data processor 810 also may have an external output device 842, which may be a display, a monitor, a printer or a communications port. The data processor 810 may be a personal computer, work station, server, medical imaging system, medical scanning system, or other system. The data processor 810 may be interconnected to a network 844, such as an intranet, the Internet, or an intranet connected to the Internet. The data processor 810 may be interconnected to another location via the network 844 either by data lines or by wireless communication. The data processor 810 is provided for descriptive purposes and is not intended to limit the scope of the present system. The data processor may have additional, fewer, or alternate components.

A program 834 may reside on the memory 832 and include one or more sequences of executable code or coded instructions that are executed by the CPU 820. The program 834 may be loaded into the memory 832 from the storage device 836 or network or removable media. The CPU 820 may execute one or more sequences of instructions of the program 834 to process data. The program 834 may provide functionality as discussed herein.

The method may include receiving endoscopic related image data 702. The image data may be entered via the data input device 838 or another input device, or received via the network 844 or other network. The data processor 810 may receive and store the medical data received in the memory 832, the storage device 836, or other storage unit. The program 834 may direct that the data received be stored on or read from machine-readable medium, including secondary storage devices such as hard disks, floppy disks, CD-ROMS, and DVDs; electromagnetic signals; or other forms of machine readable medium, either currently known or later developed.

The method 700 may include displaying endoscopic related images in one or more windows 704. The program 834 may instruct the data processor 810 to render the endoscopic related images in one or more windows on the display 840, the external output device 842, or other display screen. The types of three dimensional rendering may include surface rendering, ray casting, minimum or maximum intensity projections or other renderings. The data processor 810 may retrieve the images from machine-readable medium, including secondary storage devices such as hard disks, floppy disks, CD-ROMS, and DVDs; electromagnetic signals; or other forms of machine readable medium, either currently known or later developed.

The method 700 may include navigating through the endoscopic related images displayed via one or more operations performed directly on a window 706. The program 834 may direct the data processor 810 to perform one or more navigation functions on the image data to scroll through or otherwise view the images in or out of sequence. The navigation through the images may be initiated by performing an operation on a sub-region of a window associated with a navigation function 806a, manipulating the image or an icon associated with the image 806b, and/or spherical navigating through the images 806c. Navigation through the images may by initiated by alternative actions.

The method 700 may include performing an operation on a sub-region of a window, the sub-region being associated with a navigation function 706a. The data processor 810 may divide the display 840, output device 842, or other display screen into multiple virtual sub-regions. Each of the virtual sub-regions may be associated with a specific navigation function, such as the navigation functions discussed herein. For example, a sub-region may be associated with rotating, translating, panning, or zooming the images displayed. Other navigation functions may be provided.

The method 700 may include performing an operation directly upon an image or an icon associated with the image 706b. The data processor 810 may display images and/or associated icons on the display 840, output device 842, or other display screen. A user interface may accept one or more operations performed on the images and/or associated icons to navigate through the images. For instance, the user interface may provide for the rotation of images and/or the translation along an axis of the images by clicking upon an image and/or associated icon and moving, i.e., "dragging," the image and/or associated icon within the window with an input device, such as a mouse. Other operations may be performed.

The method 700 may include spherical navigation through the images 706c. The data processor 810 may superimpose one or more icons over the images displayed on the display 840, output device 842, or other display screen. A user interface may accept one or more operations performed on an icon. The operation performed on the icon may move the icon with respect to the image and/or another icon. For instance, the orientation and/or size of the icon may be adjusted. Other operations may be performed. As a result, corresponding image(s) displayed in one or more other windows may be adjusted accordingly, as discussed herein.

The method 700 may include facilitating intuitive alignment of corresponding images displayed in multiple windows 708. The data processor 810 may generate a user interface that displays corresponding images in one or more windows. The corresponding images displayed in two or more different windows may have corresponding icons. The corresponding icons may relate to the same location within an image or internal area of a body.

A user may alter the orientation of the corresponding images in more than one window simultaneously via an operation performed in one of the windows, as discussed herein. However, the re-orientation of the corresponding images in multiple windows may confuse a user. Accordingly, the corresponding icons may be color coded or similarly shaped, or both, to facilitate intuitive alignment of the corresponding images displayed in the different windows after repositioning. Other manners of facilitating intuitive alignment of corresponding images displayed in different windows may be used.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments and have a wide variety of applications.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A data processing system for endoscopic view visualization, the system comprising:
    a display screen operable to display endoscopy related images in a window, the window presenting an endoscopic view visualization; and
    a user interface operable to provide navigation through the endoscopy related images via an operation performed directly upon the window;
    wherein the window is divided into a plurality of sub-regions, each sub-region being associated with a navigation function.

2. The system of claim 1, wherein the navigation function associated with a sub-region comprises moving the current viewing point forward or backward.

3. The system of claim 1, wherein the navigation function associated with a sub-region comprises rotating the window about the current viewing point.

4. The system of claim 1, wherein the navigation function associated with a sub-region comprises adjusting the roll angle of the endoscopic view visualization.

5. The system of claim 1, wherein the navigation function associated with a sub-region comprises translating the current viewing point within a two dimensional plane.

6. A data processing system for endoscopic view visualization, the system comprising:
    a display screen operable to display images related to endoscopy in an endoscopic view window and a multi-planar reformatted window; and a user interface operable to provide navigation through the images in the endoscopic view window via an operation performed directly upon the multi-planar reformatted window.

7. The system of claim 6, wherein the user interface is operable to provide navigation through the images by generating a regional icon and a directional icon within the multi-planar reformatted window that together facilitate spherical navigation.

8. The system of claim 7, wherein the spherical navigation through the images is accomplished by moving the directional icon with respect to the regional icon.

9. A method for endoscopic view visualization, the method comprising:
    displaying endoscopy related images in an endoscopic view window, a three dimensional overview window, and a multi-planar reformatted window; and
    navigating through the endoscopy related images via an operation performed directly upon either the endoscopic view window, the three dimensional overview window, or the multi-planar reformatted window.

10. The method of claim 9, comprising dividing the endoscopic view window into a plurality of sub-regions to navigate through the endoscopy related images, each sub-region being associated with a navigation function.

11. The method of claim 10, wherein the navigation function associated with a sub-region comprises moving the current viewing point forward or backward.

12. The method of claim 10, wherein the navigation function associated with a sub-region comprises rotating the images displayed in the endoscopic view window about the current viewing point.

13. The method of claim 10, wherein the navigation function associated with a sub-region comprises adjusting the roll angle of the endoscopic view.

14. The method of claim 10, wherein the navigation function associated with a sub-region comprises translating the current viewing point within a dimensional plane.

15. The method of claim 9, comprising generating a regional icon and a directional icon within the multi-planar reformatted window to navigate through the images.

16. The method of claim 15, wherein the navigation through the images is accomplished by moving the directional icon with respect to the regional icon.

17. The method of claim 9, wherein the three dimension overview window comprises a geometric icon to facilitate intuitive alignment of an image displayed in the three dimension overview window with a corresponding image displayed in the endoscopic view window.

18. The method of claim 9, wherein the endoscopic view visualization window and the three dimension overview window each have one or more corresponding icons associated with the same actual location in corresponding images, the corresponding icons being color coded to facilitate intuitive alignment of the corresponding images displayed in the three dimension overview window and the endoscopic view visualization window.

19. The method of claim 9, comprising simultaneously displaying the navigation through the images displayed in the endoscopic view visualization window, the three dimensional overview window, and the multi-planar reformatted window.

20. A computer-readable medium having instructions executable on a computer stored thereon, the instructions comprising:
    displaying images in an endoscopic related window; and
    navigating through the images via an operation performed directly upon the endoscopic related window by dividing the endoscopic related window into a plurality of sub-regions, each sub-region being associated with a navigation function.

21. The computer-readable medium of claim 20, wherein the navigation function comprises moving the current viewing point forward or backward.

22. The computer-readable medium of claim 20, wherein the navigation function comprises rotating the images about the current viewing point.

23. The computer-readable medium of claim 20, comprising generating a regional icon and a directional icon in the endoscopic related window.

24. The computer-readable medium of claim 23, wherein navigating through the images is accomplished by moving the directional icon with respect to the regional icon.

25. The computer-readable medium of claim 20, comprising indicating a collision between an internal camera and a surface of a chamber.

* * * * *